United States Patent [19]

Teramachi

[11] 4,205,886
[45] Jun. 3, 1980

[54] CROSS-LINEAR BEARING UNIT

[76] Inventor: Hiroshi Teramachi, 2-34-8, Higashi-Tamagawa, Setagaya-ku, Tokyo, Japan, 158

[21] Appl. No.: 941,127

[22] Filed: Sep. 11, 1978

Related U.S. Application Data

[63] Continuation-in-part of Ser. No. 838,144, Sep. 30, 1977, Pat. No. 4,118,101.

[30] Foreign Application Priority Data

Nov. 30, 1977 [JP] Japan ................................ 52-142717

[51] Int. Cl.² ............................................. F16C 29/06
[52] U.S. Cl. .................................... 308/6 C; 33/1 M; 308/3 A; 308/6 R
[58] Field of Search .............. 308/6 R, 6 A, 6 B, 6 C, 308/3 A; 33/1 M; 248/124, 287; 403/389, 391, 399

[56] References Cited

U.S. PATENT DOCUMENTS

| | | | |
|---|---|---|---|
| 3,624,910 | 12/1971 | Farrand | 208/6 R |
| 4,040,679 | 8/1977 | Teramachi | 308/6 C |
| 4,118,101 | 10/1978 | Teramachi | 308/6 C |

*Primary Examiner*—Charles E. Frankfort
*Attorney, Agent, or Firm*—George B. Oujevolk

[57] ABSTRACT

A cross-linear bearing unit comprising of: a bearing body having on its one surface a raceway which forms a load track and a return track and is adapted to fit a race bar therein, the bearing body further having a rail hole which forms a load track and a return track and is adapted to fit a rail therein, the rail hole piercing through the bearing body in the direction orthogonal with the raceway; balls inserted in the load track and return track; a retainer disposed in the raceway of the bearing body and serving to hold, out of the balls inserted in the groove of the raceway, the loaded balls in the manner that the balls are rolled while being kept in contact with both the load track surface of the bearing body and the load track surface of the race bar, the retainer also serving to hold the nonloaded balls in the manner that the balls are rolled freely in the return track of the bearing body; and another retainer disposed in the rail hole of the bearing body and serving to hold, out of balls inserted in the groove of the rail hole, the loaded balls in the manner that the balls are rolled while being kept in contact with both the load track surface of the bearing body and the load track surface of the rail, the retainer also serving to hold the nonloaded balls in the manner that the balls are rolled freely in the return track of the bearing body: wherein the rails are mounted on a bed horizontally or vertically through bearings respectively, and a slide base is attached to the race bars orthogonal with the rails.

1 Claim, 3 Drawing Figures

CROSS-LINEAR BEARING UNIT

This application is a Continuation-in-Part of application Ser. No. 838,144, filed Sept. 30, 1977, now U.S. Pat. No. 4,118,101.

BACKGROUND OF THE INVENTION

1. Field of the Invention

The present invention relates to a bearing which is adapted for use at an intersection of a column and a cross rail in a machine tool such as boring or planing machine or at an intersection of vertical and horizontal shafts in a general conveyor so as to support and slide a heavy-weight object, and more particularly it relates to a cross-linear bearing unit capable of achieving accurate positioning of a slide member by linearly moving the same in both vertical and horizontal directions.

2. Description of the Prior Art

A tool rest disposed on a column and a cross rail in a machine tool generally receives, during a machining operation, great forces exerted in reverse, downward and horizontal directions in addition to the extremely large weight of its own. Since such forces are exerted at a point spaced apart from the tool rest plate, a large reversal force is applied to the column shaft. Therefore, it has been customary heretofore to use a slide guide surface in the guide region for elimination of the resultant problem. In the case of a rolling guide, a large-diameter column shaft is employed with a bearing of a corresponding large load capacity such as described in the U.S. Pat. Nos. 3,003,828 or 3,341,262. However, incorporating the bearing of this type into a machine causes an increase in the production cost due to the necessity of using an expensive hardened steel plate, and moreover it is extremely difficult to attain a high accuracy particularly in the case where a plurality of such bearings are disposed at horizontal and vertical positions.

SUMMARY OF THE INVENTION

It is an object of the present invention to provide a cross-linear bearing unit which is capable of achieving accurate positioning of a slide member mounted on a race bar by linearly moving the slide member in both vertical and horizontal directions, wherein the load-carrying capacity of a bearing body is increased, and the space between the race bar and a rail fitted respectively into a receway and a rail hole can be minimized.

DETAILED DESCRIPTION OF THE INVENTION

Hereinafter an exemplary embodiment of the present invention will be described in detail with reference to the accompanying drawings.

Figure 1:
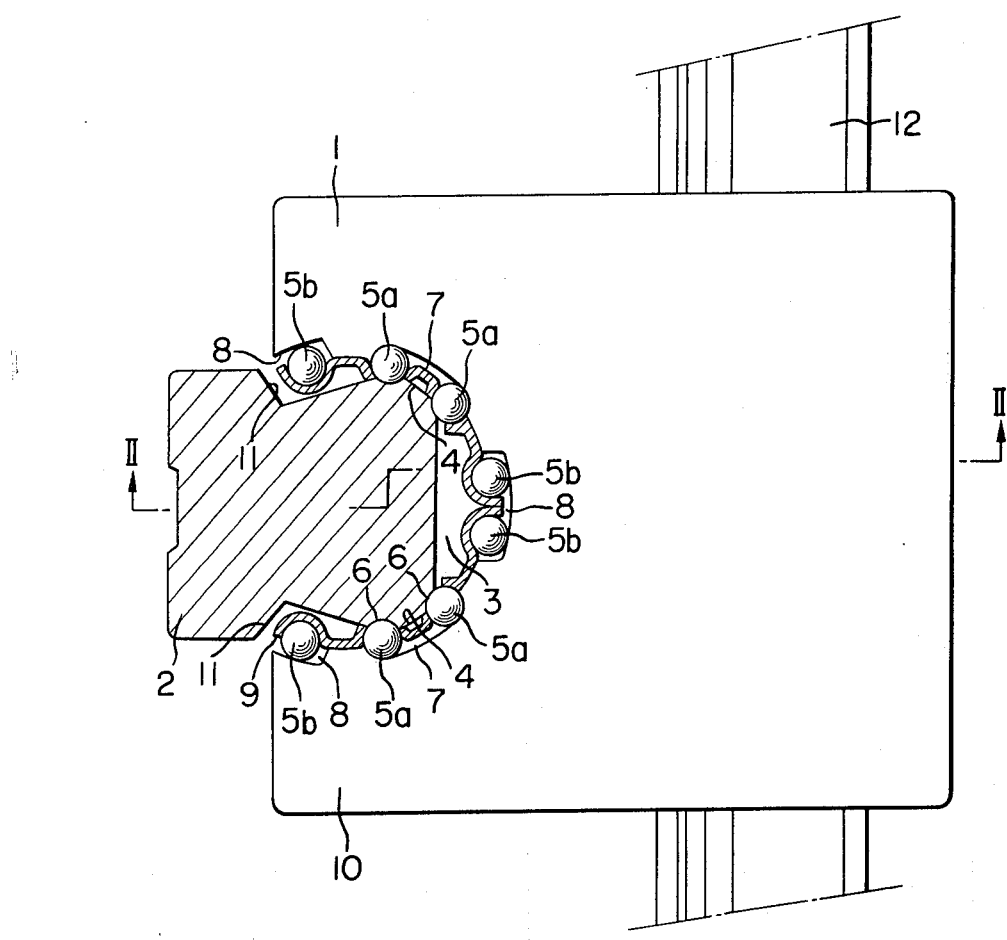
FIG. 1 is a partially cutaway front view of a cross-linear bearing unit according to the present invention.
Figure 2:
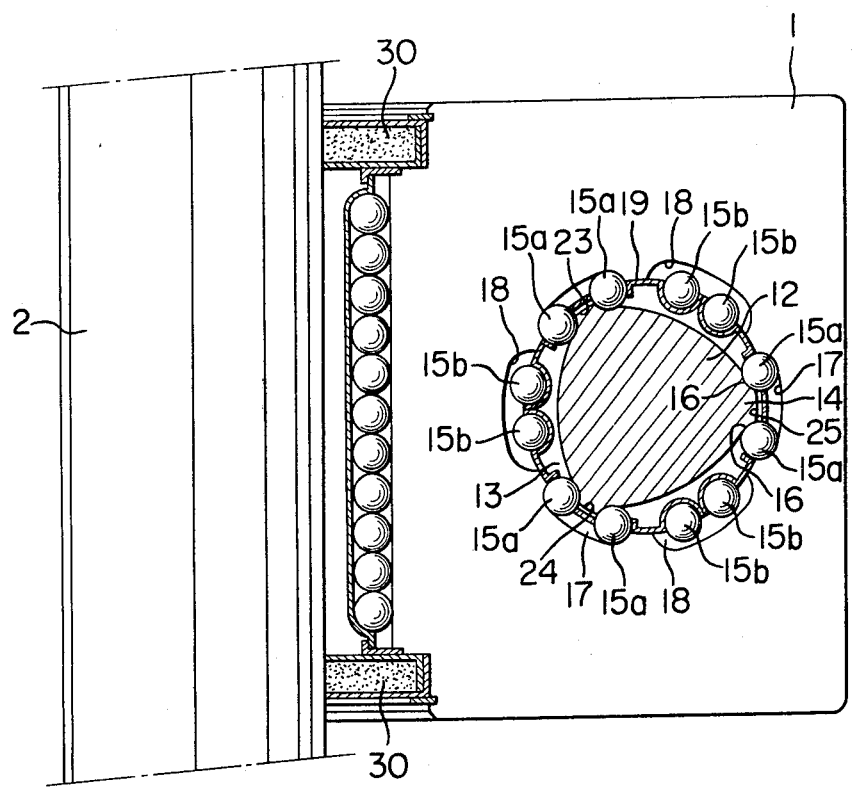
FIG. 2 is a sectional view taken along the line II—II in FIG. 1.

As shown in FIGS. 1 and 2, a raceway 3 where a race bar 2 is fittable is formed on one side of a bearing body 1, and a rail hole 13 where a rail 12 is fittable is formed in the manner to pierce through the bearing body 1 in the direction orthogonal with the raceway 3.

The raceway 3 in the bearing body 1 is equipped with loaded-ball guide grooves 7, 7 having a substantially U-shaped cross section and constituting a load track where loaded balls 5a, 5a are rollable in two rows, a nonloaded-ball guide grooves 8 formed between the guide grooves 7, 7 and having a substantially U-shaped cross section and constituting a return track where nonloaded balls 5b, 5b are rollable in two rows, and grooves formed outside of the guide grooves 7, 7 and constituting a return track where the nonloaded balls 5b are rollable in one row. The ends of the load-track grooves 7, 7 are connected respectively to the adjacent nonloaded-track grooves 8, 8; 8 so as to permit circulation of the balls.

The cross-sectional shape of the race bar 2 fittable into the raceway 3 in the bearing body 1 is uniform over the entire length and is symmetrical with respect to its left and right. On shoulders 4, 4 of the race bar 2, rolling grooves 6, 6 for the loaded balls 5a, 5a are formed in the longitudinal direction at positions opposite to the nonloaded-track grooves 7, 7 of the raceway 3 in the bearing body 1, thereby constituting a rolling path for the loaded balls 5a, 5a through mutual cooperation. Along two sides of the race bar 2, recesses 11, 11 are formed in the longitudinal direction thereof correspondingly to the grooves 8, 8 which constitute the return track in the bearing body 1.

The balls are held in the raceway 3 of the bearing body 1 by a retainer 9 in such a manner that the loaded balls 5a, 5a . . . are rolled into the return-track grooves 8, 8, 8 while being kept in contact with the guide grooves 7, 7 constituting the load track in the bearing body 1 and also with the rolling grooves 6, 6 . . . formed in the race bar 2, meantime the unloaded balls 5b, 5b . . . are rolled freely in the return-track grooves 8, 8, 8 of the bearing body 1 and are returned smoothly into the load-track grooves 7, 7.

The rail hole 13 formed in the bearing body 1 is equipped with loaded-ball guide grooves 17, 17, 17 having a substantially U-shaped cross section with a relatively small depth from the inner-diameter surface thereof and constituting a load track where loaded balls 15a, 15a are rollable in two rows, and nonloaded-ball guide grooves 18, 18, 18 having a substantially U-shaped cross section with a larger width and a relatively small depth from the inner-diameter surface and constituting a return track where nonloaded balls 15b, 15b are rollable in two rows. The both guide grooves are arrayed alternately in the axial direction, and the ends of the load-track guide grooves 17, 17, 17 are connected respectively to the adjacent nonloaded track guide grooves 18, 18, 18 so as to permit circulation of the balls.

The rail 12 fittable into the rail hole 13 in the bearing body 1 serves also as a spline shaft, whose cross-sectional shape is uniform over the entire length and is substantially triangular with swells and protrusions 23, 24, 25. And the two sides of each vertex of the triangle, rolling grooves 16, 16 for the loaded balls 15a, 15a are formed in the longitudinal direction thereof at positions opposite to the load-track guide groove 17 of the rail hole 13 in the bearing body 1, thereby constituting a rolling path for the loaded balls 15a, 15a . . . through mutual cooperation.

The balls are held in the rail hole 13 of the bearing body 1 by a retainer 19 in such a manner that the loaded balls 15a, 15a . . . are rolled into the return-track guide grooves 18, 18, 18 while being kept in contact with the guide grooves 17, 17, 17 constituting the load track in the bearing body 1 and also with the rolling grooves 16, 16 . . . formed in the rail 12, meantime the unloaded balls 15b, 15b are rolled freely in the return-track guide grooves 18, 18, 18 of the bearing body 1 and are returned smoothly into the load-track guide grooves 17, 17, 17.

Figure 3:
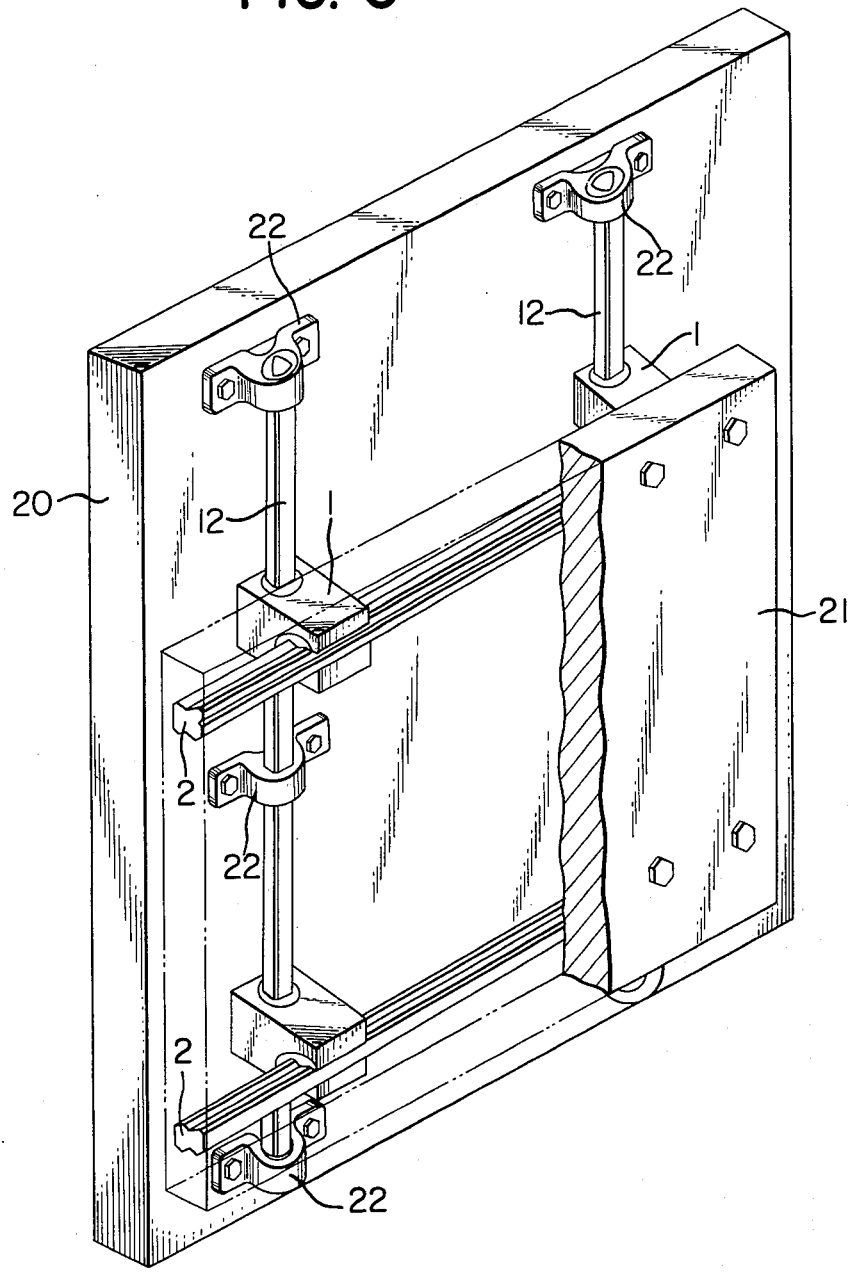
FIG. 3 is a perspective view illustrating how the bearing unit of FIG. 1 is employed.

Thus, the above-described embodiment of cross-linear bearing unit is so constructed as to be able to support a tensile load applied in the direction where the bearing body 1 separates from the race bar 2. In FIG. 3 showing an example of using four bearing bodies 1, 1, 1, 1, two of them are mounted on each of two parallel rails 12, 12 provided on a bed 20, and two parallel race bars 2, 2 are fitted into the bearing bodies 1, 1, 1, 1 with a slide base 21 attached fixedly to the race bars 2, 2 so as to be slid vertically and horizontally. And when the slide base 21 is slid leftward or rightward, a pressure load is applied to the bearing bodies 1, 1 located on one rail 12, while a tensile load is applied to the bearing bodies 1, 1 on the other rail 12. In this case, each bearing body 1 is capable of supporting with certainty the load resulting from the slide base 21, hence offering a remarkably wide scope of application and great conveniences in practical use.

It is to be understood that the cross-linear bearing unit of the present invention is not restricted merely to the aforementioned embodiment and exemplary use illustrated where the positions of the raceway and the rail hole are orthogonal with each other, and the intersection angle thereof is selectable as desired. In this case, the intersection angle of the race bar and the rail is determined in accordance with that of the raceway and the rail hole formed in the bearing body.

Furthermore, it is also possible to incline either the raceway or the rail hole in the bearing body along its longitudinal direction and to position the slide base along the inclined surface.

What is claimed is:

1. A cross-linear bearing arrangement for supporting and slide-moving a heavy load in two orthogonal directions, comprising:
   (a) a flat bed (20) for supporting the bearing arrangement and the load thereon;
   (b) first and second parallel rails (12) supported over the bed (20) by bearing members (22);
   (c) first, second, third and fourth bearing bodies (1) extending outward and perpendicular to the flat bed (20), each bearing body having an outer end, and the bearing bodies respectively having a first, second, third, and fourth rail hole (13) extending through an inner portion thereof, said first rail passing through said first and second rail holes (13), said second rail passing through said third and fourth rail holes (13), said rail holes (13) having grooves therein and defining a load track and a return track in each said rail hole;
   (d) bearing balls (15a, 15b) disposed in said grooves;
   (e) an annular retainer (19) disposed in each of said rail holes (13) serving to hold, from out of said balls (15a, 15b) certain balls as loaded balls which are rolled while being kept in contact with both the load track of the bearing body (1) and a load track surface of the rail (12), said retainer (19) also serving to hold non-loaded balls (15b) so that said balls roll freely in the return track of the bearing body;
   (f) first, second, third, and fourth open raceways (3) defined at the outer ends of each of said bearing bodies;
   (g) first and second parallel race bars (2), said first race bar being disposed in said first and third raceways, said second race bar being disposed in said second and fourth raceways;
   (h) loaded guide grooves (7) of substantially U-shape configuration in each raceway (3) and unloaded guide grooves (8) adjacent each of said loaded guide grooves (7) defining a load track and a return track, respectively;
   (i) bearing balls (5a, 5b) held in each said raceway (3) and a U-shaped retainer means (9) in each said raceway for holding said balls, said retainer means serving to select, from among the balls (5a, 5b) in the raceway (3), loaded balls, which are kept in contact with both the load track of the bearing body (1) and a load track surface of the race bar (2) and also serving to hold the unloaded balls (5b) to roll freely in the return track of the bearing body (1); and,
   (j) a flat slide back (21) mounted on said first and second race bars.

* * * * *